(12) United States Patent
Nakamura

(10) Patent No.: US 9,100,841 B2
(45) Date of Patent: *Aug. 4, 2015

(54) SYSTEM HAVING ELECTRONIC DEVICE WITH MULTIPLE INTERFACES AND HOST APPARATUS, INFORMATION PROCESSING DEVICE, ELECTRONIC DEVICE, AND SETUP METHOD, CONTROL METHOD AND PROGRAM THEREFOR

(75) Inventor: Atsushi Nakamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/419,969

(22) Filed: Mar. 14, 2012

(65) Prior Publication Data

US 2012/0176648 A1 Jul. 12, 2012

Related U.S. Application Data

(63) Continuation of application No. 11/443,383, filed on May 30, 2006, now Pat. No. 8,161,170.

(30) Foreign Application Priority Data

May 30, 2005 (JP) ................................. 2005-157101

(51) Int. Cl.
*G06F 15/00* (2006.01)
*H04W 24/00* (2009.01)
*H04W 48/20* (2009.01)
*H04W 84/12* (2009.01)
*H04W 88/02* (2009.01)

(52) U.S. Cl.
CPC .............. *H04W 24/00* (2013.01); *H04W 48/20* (2013.01); *H04W 84/12* (2013.01); *H04W 88/02* (2013.01)

(58) Field of Classification Search
USPC .................. 709/223–226; 370/230, 332, 338; 455/432.1–453
See application file for complete search history.

(56) References Cited

U.S. PATENT DOCUMENTS

| 6,940,843 | B2 * | 9/2005 | Goodall et al. ................ 370/338 |
| 7,230,920 | B1 * | 6/2007 | Stratigakis ..................... 370/230 |
| 2005/0099962 | A1 * | 5/2005 | Matsuda ........................ 370/254 |
| 2006/0176827 | A1 * | 8/2006 | Lehew et al. .................. 370/252 |
| 2009/0019141 | A1 * | 1/2009 | Bush et al. ..................... 709/223 |

* cited by examiner

*Primary Examiner* — Thai Nguyen
(74) *Attorney, Agent, or Firm* — Cowan, Liebowitz & Latman, P.C.

(57) ABSTRACT

In order to make it possible to confirm an electronic device installation place where communication trouble occurrence is reduced, settings for communication via a second interface are made via a first interface when the electronic device is connected to a host device to install a device driver. After that, a message is displayed to a user to the effect that the electronic device should be placed at a location where it is actually used to cause user to place the electronic device at the location where it is actually used. After the installation of the electronic device, the communication state via the second interface is measured to determine whether the electronic device installation place is suitable or not.

22 Claims, 16 Drawing Sheets

FIG. 1
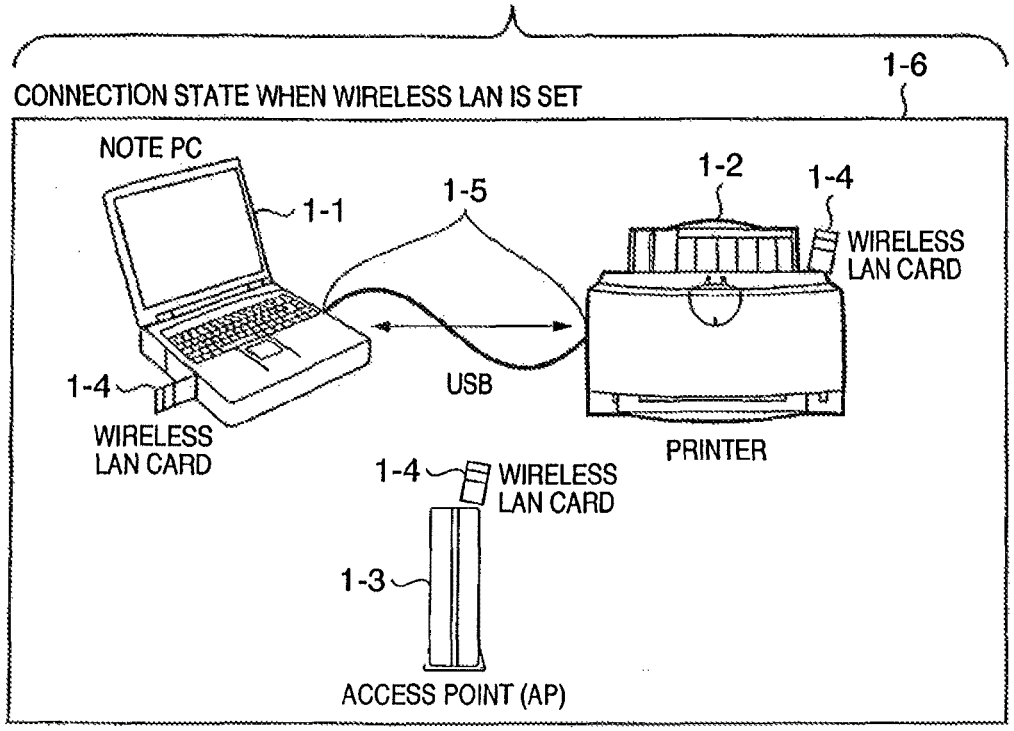
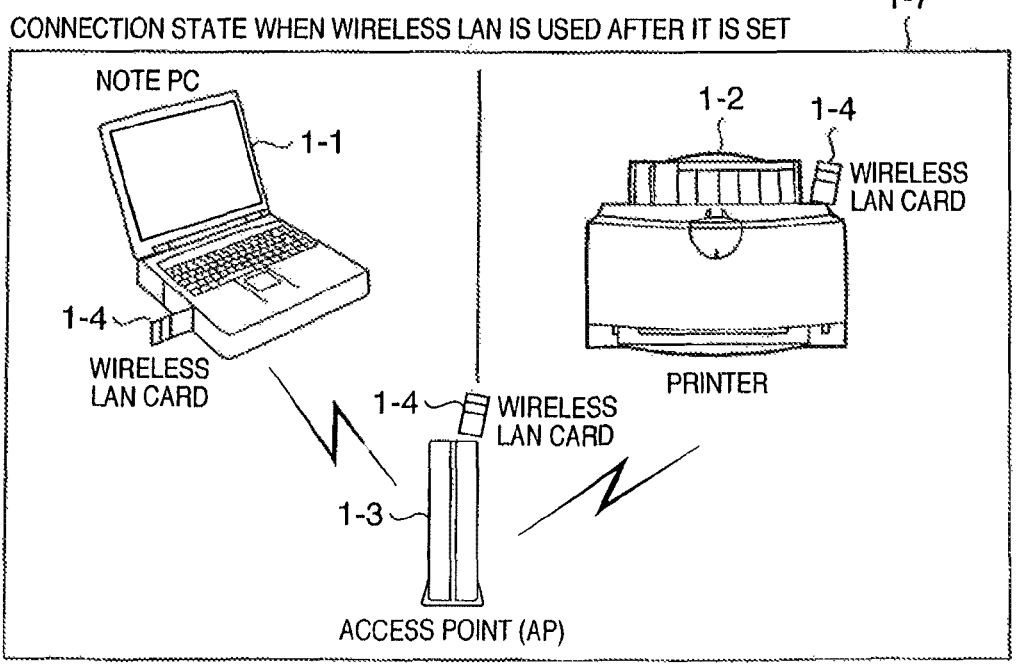

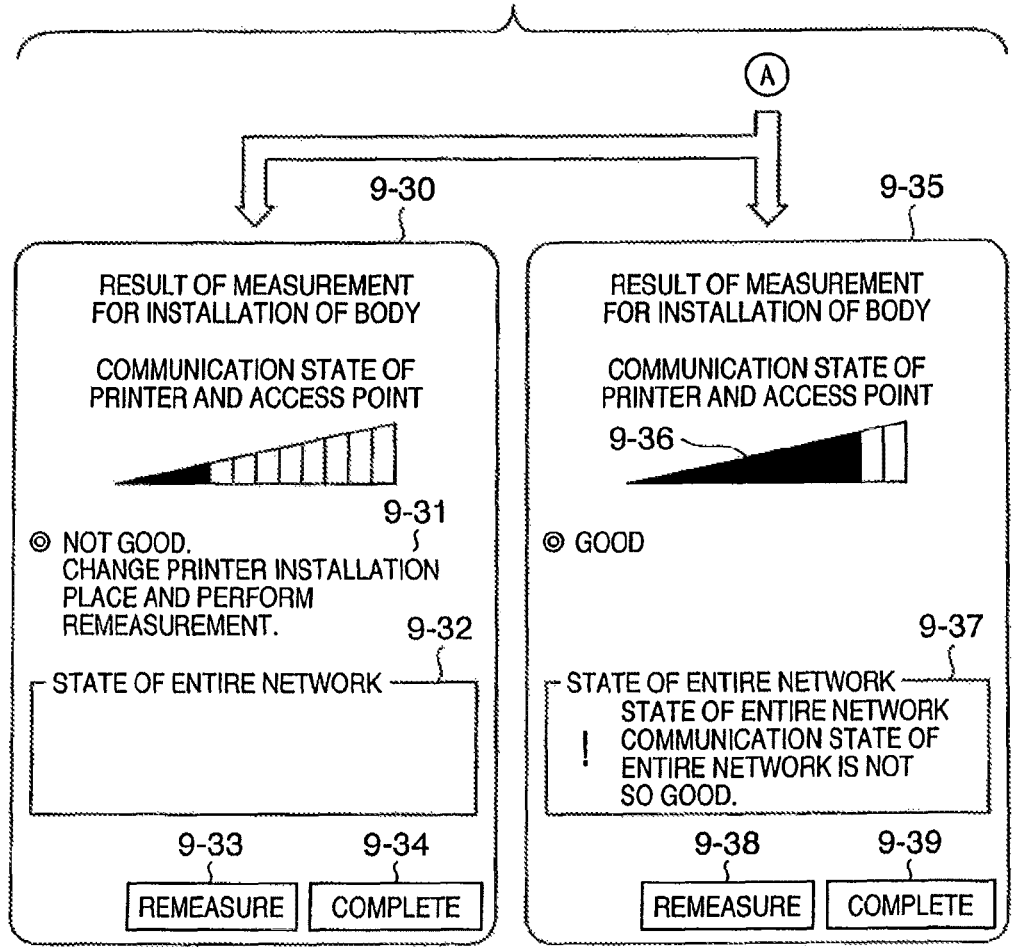

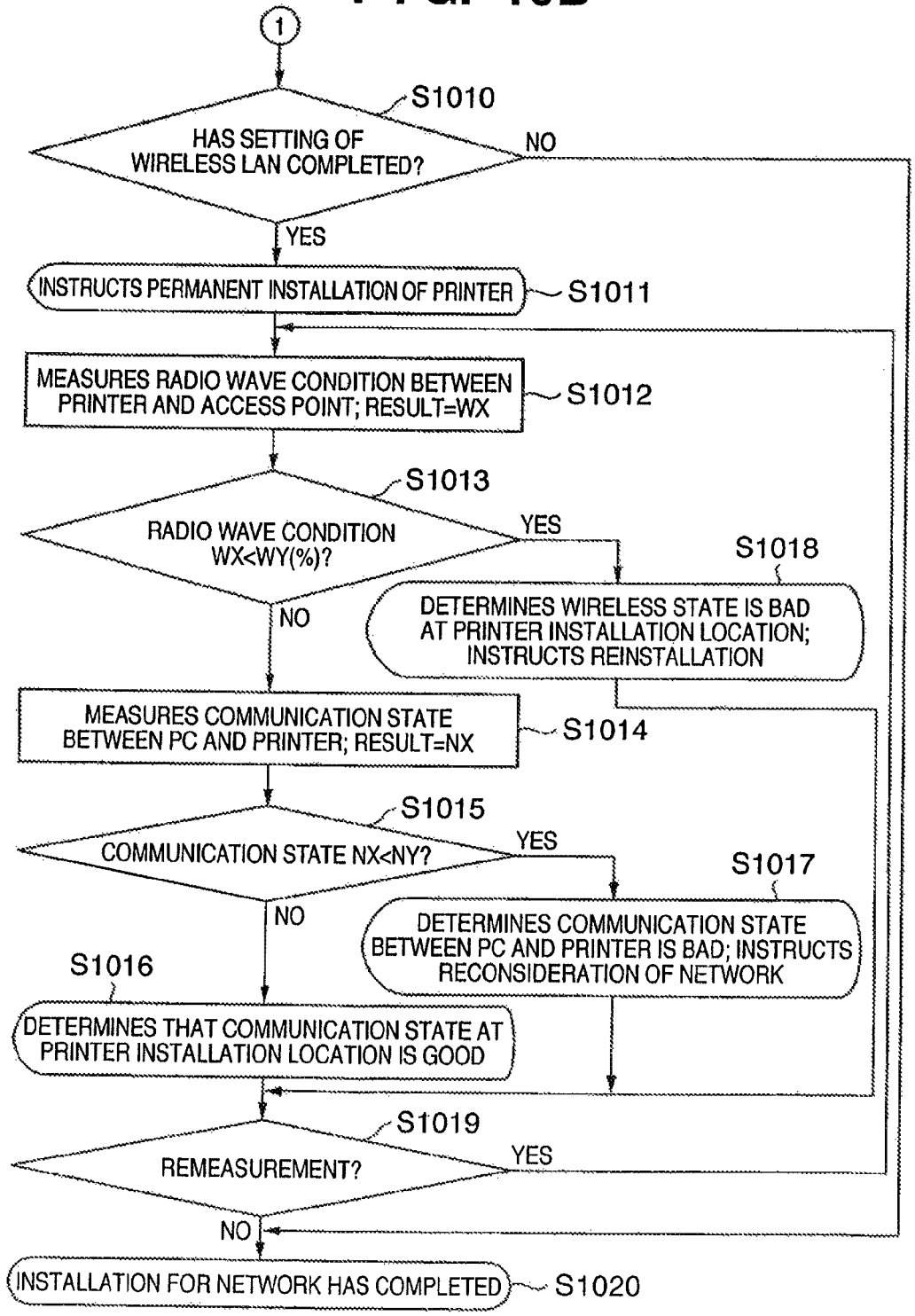

F I G. 11

NETWORK CONTROLLER CONTROL COMMANDS
- ACCESS POINT SEARCH COMMAND
- ACCESS POINT SEARCH RESULT ACQUISITION COMMAND
- INFORMATION ACQUISITION COMMAND
- ELECTRIC INTENSITY ACQUISITION COMMAND
- INFORMATION SETTING COMMAND

FIG. 12

NETWORK COMMANDS
- PRINTER SEARCH COMMAND (BROADCAST)
- PRINTER SEARCH COMMAND (WITH ADDRESS SPECIFIED)
- PAYLOAD TRANSFER MEASUREMENT COMMAND

FIG. 13

| MEASUREMENT RESULT WX (%) | DISPLAYED ICON | DISPLAYED MESSAGE |
|---|---|---|
| MEASUREMENT CANCELLED | (?) | MEASUREMENT HAS BEEN CANCELLED. |
| MEASUREMENT PROCESSING FAILED | (?) | MEASUREMENT IS IMPOSSIBLE. REFER TO COUNTERMEASURE METHOD DESCRIBED IN HELP TO ENABLE COMMUNICATION. |
| AVERAGE VALUE: 0 | ⊗ | COMMUNICATION IS IMPOSSIBLE. REFER TO COUNTERMEASURE METHOD DESCRIBED IN HELP TO ENABLE COMMUNICATION. |
| AVERAGE VALUE: 1 TO 32 | △! | VERY UNSTABLE. REFER TO COUNTERMEASURE METHOD DESCRIBED IN HELP TO CHANGE INSTALLATION LOCATION AND MAKE COMMUNICATION STATE GOOD. |
| AVERAGE VALUE: 33 TO WY | △ | UNSTABLE. THERE IS HIGH POSSIBILITY THAT PRINTING MAY BE SLOW OR UNSTABLE. REFER TO COUNTERMEASURE METHOD DESCRIBED IN HELP TO CHANGE INSTALLATION LOCATION AND MAKE COMMUNICATION STATE GOOD. |
| AVERAGE VALUE: WY+1 TO 65 | ✓ | COMMUNICATION IS POSSIBLE BUT NOT IN GOOD CONDITION. THERE IS POSSIBILITY THAT PRINTING MAY BE SLOW OR UNSTABLE. REFER TO COUNTERMEASURE METHOD DESCRIBED IN HELP TO CHANGE INSTALLATION LOCATION AND MAKE COMMUNICATION STATE GOOD. |
| AVERAGE VALUE: 66 TO 100 | ✓ | GOOD |

FIG. 14

| MEASUREMENT RESULT NX | DISPLAYED MESSAGE |
|---|---|
| MEASUREMENT CANCELLED | MEASUREMENT HAS BEEN CANCELLED. |
| MEASUREMENT PROCESSING FAILED | MEASUREMENT IS IMPOSSIBLE. REFER TO COUNTERMEASURE METHOD DESCRIBED IN HELP TO ENABLE COMMUNICATION. |
| 1~NY | NETWORK COMMUNICATION STATE BETWEEN COMPUTER AND PRINTER IS UNSTABLE. CHANGE DEVICE CONFIGURATION OR SETTINGS TO MAKE COMMUNICATION STATE GOOD. |
| NY~ | COMMUNICATION STATE IS GOOD. |

SYSTEM HAVING ELECTRONIC DEVICE WITH MULTIPLE INTERFACES AND HOST APPARATUS, INFORMATION PROCESSING DEVICE, ELECTRONIC DEVICE, AND SETUP METHOD, CONTROL METHOD AND PROGRAM THEREFOR

CROSS-REFERENCE TO RELATED APPLICATION

This application is a continuation of application Ser. No. 11/443,383, filed May 30, 2006, the entire disclosure of which is hereby incorporated by reference.

FIELD OF THE INVENTION

The present invention relates to a system having an electronic device with multiple interfaces and a host device, and in particular to a setup technique for the electronic device.

BACKGROUND OF THE INVENTION

Recently, there have been electronic devices (hereinafter referred to as devices) such as a printer and a printer adapter provided with a wireless interface. As an example, there is a printer on which printing can be performed from a PC (personal computer) via a wireless LAN access point (hereinafter referred to as an AP) in accordance with the 802.11b/g/a standard which is standardized by IEEE.

Wireless communication is influenced by the distance between an AP and a device, obstacles existing between them, the antenna characteristics (such as directionality and sensitivity) of the device, radio wave intensity and the like, and communication quality or communication speed changes depending on the state. If there is any factor that can be a bad condition, for example, the situation that the place where the device is installed is far away from the AP, it adversely affects the wireless communication, naturally. As a result, the normal operation of the device is impeded. To cope with this, there is a software program for measuring the radio wave condition of a wireless LAN connection interface mounted on a PC. There is also a system in which the radio wave condition of a child device, which is a device to be measured, is measured, and the measured radio wave condition is displayed on a parent device, as described in U.S. Patent Publication No. 2002/119756 (Japanese Patent Laid-Open No. 2002-261676).

In many cases, device settings for realizing a desired wireless LAN connection is complicated and technical knowledge about a wireless LAN or a network is required, and it is difficult to set up a wireless LAN device.

In a setup method for setting up a wireless LAN via a wireless LAN interface, it is necessary to make wireless LAN communication settings for a PC so that they are appropriate for a device to be set up. That is, it is necessary to change the wireless operation mode, the connection ID (SSID) and the like of the PC to be appropriate for the device. Therefore, there is a problem that it may be impossible to perform setup without changing the wireless LAN settings for the PC which have enabled home wireless LAN communication until then. There is also the inconvenience that, when connecting a device to an AP, a user has to remember the SSID of the AP, and input and set the SSID. In order to solve such problems, a setup method has been considered in which setup of the wireless LAN interface of a device is performed with an interface other than the wireless LAN interface. For example, there has appeared a setup method in which, for example, a printer and a PC are connected with a USB cable, and the settings for the wireless LAN interface on the printer side are made from the PC via the USB interface.

In this case, in order to prepare the printer to be usually used, the flow shown below should be followed:
1) Temporarily place the printer within a range where it can be connected with the PC via a USB cable;
2) Connects the printer and the PC with a USB cable and executes the setup program for the printer on the PC; and
3) Removes the USB cable after the printer becomes normally connectable to a wireless LAN in the setup, place the printer where it is permanently to be set, and starts use of the printer.

As described above, in the setup method with the use of a wired interface such as a USB interface, a printer may be permanently installed after the setup without giving much consideration to the communication quality of a wireless LAN or a network. Therefore, even if the communication state is good when the printer is temporarily placed for setup, the communication state of the printer may be deteriorated at the place of permanent placement. For example, there may be a case where communication quality is deteriorated and printing cannot be performed with the original performance (such as printing speed) because the location relation between a printer and an AP, the location relation between the AP and a client PC, or the network connection configuration changes after permanent installation. There may be even a case where normal printing cannot be performed.

As a result, the user wastes paper and ink because of printing defects. Furthermore, it becomes necessary to again consider the location of the printer, which has already been permanently installed, and rearrange the printer so that printing can be normally performed with predetermined performance. This is inconvenient.

The communication performance between a client PC and a printer, which is to be an indicator for measuring the printing performance (printing speed), is determined by the entire communication route including the route between the client PC and the AP. Even when the radio wave condition is good, the entire route must be improved if the network route between the client PC and the printer is not good. Furthermore, in order to check the communication quality of a network required for the printer, it is necessary to check communication with the data amount to be transferred when printing is performed or the transfer speed used then. If printing is actually performed for confirmation, it will lead to waste of paper and ink.

SUMMARY OF THE INVENTION

The object of the present invention is to provide a technique which enables installation of a device in consideration of a wireless communication state to be performed more easily.

In order to achieve the above object, the system provided with an electronic device and a host device according to the present invention has the following configuration. A system provided with an electronic device and a host device, the electronic device comprising a first interface capable of accepting device settings made by the host device and a second interface capable of communicating with the host device; and the host device comprising a setting unit for making device settings including settings for communication via the second interface via the first interface when the host device installs device driver corresponding to the electronic devices, a measurement unit for measuring quality of communication via the second interface after the device settings for the electronic device being made by the setting unit and a determination unit for making determination at least on whether the installation place of the electronic device is appropriate or not based on the communication quality measured by the measurement unit.

By virtue of the present invention, it is possible to provide a technique that realizes installation of a device in consideration of a wireless communication state to be performed more easily.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 shows the entire system configuration of this embodiment;

FIGS. 9A and 9B show an example of screens for wireless network setting processing according to this embodiment;

FIGS. 10A and 10B are flowcharts of wireless network setting according to this embodiment;

FIG. 11 shows network controller control commands;

FIG. 12 shows commands to be sent and received via a wireless network;

FIG. 13 illustratively shows criteria for making determination on the result WX of measurement of the communication state between a printer and an access point; and FIG. 14 illustratively shows criteria for making determination on the result WX of measurement of the communication state between the printer and a PC.

DETAILED DESCRIPTION OF THE PREFERRED EMBODIMENT

Figure 2:
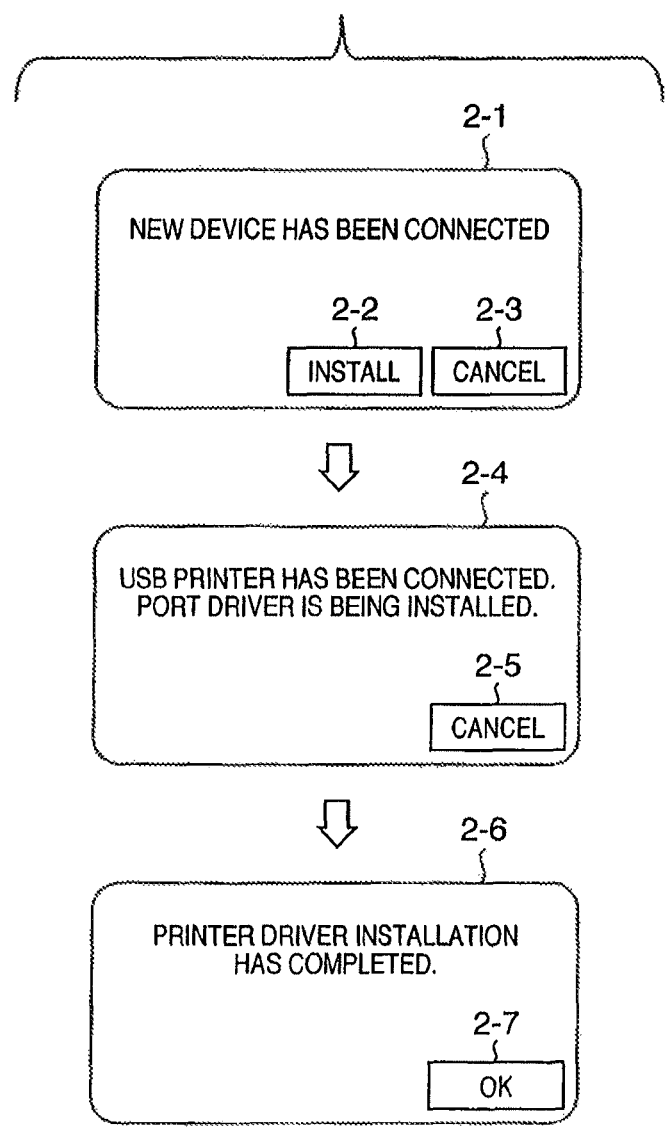
FIG. 2 is a diagram showing screens for a common printer driver installation procedure.

A preferred embodiment of the present invention will be illustratively described below in detail with reference to drawings. The components described in this embodiment are only examples and are not intended to limit the scope of this invention thereto.

<System Configuration>

FIG. 1 shows the entire system configuration of this embodiment. In the figure, a note PC 1-1 has a USB (Universal Serial Bus) interface 1-5 as a wired local interface. The note PC 1-1 can be also equipped with a PC-card type wireless LAN card 1-4, for example, in conformity with IEEE802.11 as a wireless interface. A printer 1-2 is also provided with both of a wired local interface and a wireless interface similarly to the PC. The wired local interface 1-5 is a USB interface, and the printer 1-2 can be connected to the PC via the cable. As the wireless interface, a PC-card type wireless LAN card 1-4, for example, in conformity with IEEE802.11 is attached. By being attached with a PC-card type wireless LAN card 1-4 in conformity with IEEE802.11, an access point (hereinafter referred to as an AP) 1-3 realizes a function of intermediating between wireless devices. It is possible to send print data from the PC to the printer via the USB interface 1-5, which is a wired local interface. It is also possible to send print data from the PC to the printer 1-2 via the AP 1-3 with the use of a wireless LAN interface. Though only one PC is shown in the figure, it is also possible that multiple PC's are connected to one AP to share one printer and perform printing.

For a wireless LAN, there is a mode for communicating with multiple wireless LAN devices via an AP, which is referred to as an infrastructure mode. In the infrastructure mode, a LAN can be configured via an AP by setting the same SSID (service set identifier) as the SSID set for the AP, for wireless LAN devices. In the case of using a printer with the use of wireless LAN communication, it is necessary to set the wireless LAN interface of the printer so that it is connectable to the AP.

In this embodiment, it is assumed that a wireless LAN between the PC 1-1 and the AP 1-2 has already been set, and communication can be performed in the infrastructure mode. It is also assumed that, as for the wireless LAN interface of the printer 1-2, settings have not been made yet, the infrastructure mode is set as a default, and the SSID is not set. Most of printers which are not equipped with a wireless LAN interface are those which are connected to a PC with a USB interface to perform printing. The printer 1-2 is also capable of performing printing via a USB interface similarly to a common printer. Some OS (operating system) is operating on the PC 1-1, and a printer driver is required to perform printing in the OS environment. A printer driver is provided by an OS manufacturer or a printer manufacturer, and it is installed in a PC in advance or provided by a storage medium such as a CD-ROM. It is necessary to install a printer driver in a PC in some form in order to perform printing with a printer. Furthermore, in the case of performing printing with the use of a wireless LAN, it is necessary to make settings for the wireless LAN interface of a printer so that it is connectable to an AP. Furthermore, it is also necessary to install software in the PC, which enables printing via a wireless LAN, and make settings appropriate for the printer.

Various methods are used for installation work for a wireless LAN device. In a setup method in which a wireless LAN device is set up via a wireless LAN interface, it is necessary first to make wireless LAN communication settings for a PC, such as a wireless operation mode and a connection ID (SSID), in accordance with the wireless LAN device to be set up. That is, there is a problem that it is not possible to perform setup without once changing the wireless LAN settings for the PC under which wireless communication has been normally performed. There is also inconvenience that, when connecting the device to an AP, a user has to remember the SSID of the AP, and input and set the SSID.

In order to solve these problems, there has been devised a setup method in which a wireless LAN is set up with the use of an interface other than a wireless LAN interface, for which operation preparation is simple. For example, there has appeared a setup method in which a wireless LAN is set up by connecting a printer and an AP with a wired LAN interface. In this case, however, by connecting the printer and the AP, the connection state of and the settings for the AP already used in a home may be changed by the setup. In such a case, it is difficult and troublesome to recover the original state. Furthermore, in this case, there is a problem that it is difficult to check whether the connection is correctly performed because the PC for performing setting operation and the printer are still connected via the wireless LAN.

In comparison with the above, settings for a wireless LAN are made with the use of the USB interface 1-5 in this embodiment, as shown in a configuration 1-6 in FIG. 1. The printer 1-2 provided with a wireless LAN and a USB interface is connected to a PC via a USB interface, similarly to the case of installation for a USB printer. It is possible to make settings for a wireless LAN without changing the connection after installing a printer driver. The wireless LAN settings for the printer 1-2 are made through USB communication between the PC 1-1 and the printer 1-2. Therefore, it is possible to make the wireless LAN settings for the printer 1-2 without changing the wireless LAN settings and the physical connection for the PC or the AP for which normal communication settings have already been made. A configuration 1-7 in FIG. 1 shows the configuration after the wireless LAN settings for the printer 1-2 have been made and communication is enabled. In the configuration 1-7 in FIG. 1, after removing the USB interface 1-5 between the PC 1-1 and the printer 1-2, and positioning the printer 1-2 at a location away from the PC 1-1, printing through communication via the AP 1-3 with the use of a wireless LAN can be performed.

Now, after describing commonly performed installation of a printer driver, description will be made on installation of a printer driver with the use of a USB interface and a method for setting up a wireless LAN with the use of a USB interface in this embodiment.

<Printer Driver Installation Commonly Performed>

In order to connect a printer to a host computer (PC) to enable printing, software is required which, on the OS of the PC, understands a print command from a print application, transfers a print control command and print data based on the print command to the printer and controls the printer. The software which controls the printer is the printer driver described above.

As typified by the printer driver, all pieces of hardware connected to a PC are controlled by receiving a control command from an application via a device driver. Since a device driver is not dedicated to a particular higher-level application activated on the OS, it occupies a particular memory area and resides there as a kind of resident program while the device is connected to the PC.

Recent OS's typified by Windows (registered trademark) have a plug-and-play function of, when a device is connected to a PC, automatically incorporating an appropriate device driver compatible with the device. If, in the plug-and-play processing performed when a device is connected to a PC for the first time, there is not an optimum one among device drivers provided for the OS as a standard, it is necessary to incorporate a device driver into the OS, which is stored in a medium such as a floppy disk and a CD-ROM and attached to the device when the device is purchased. The processing for incorporating the device driver is referred to as driver installation processing.

The device driver installation processing for a plug-and-play OS will be described below.

Figure 3:
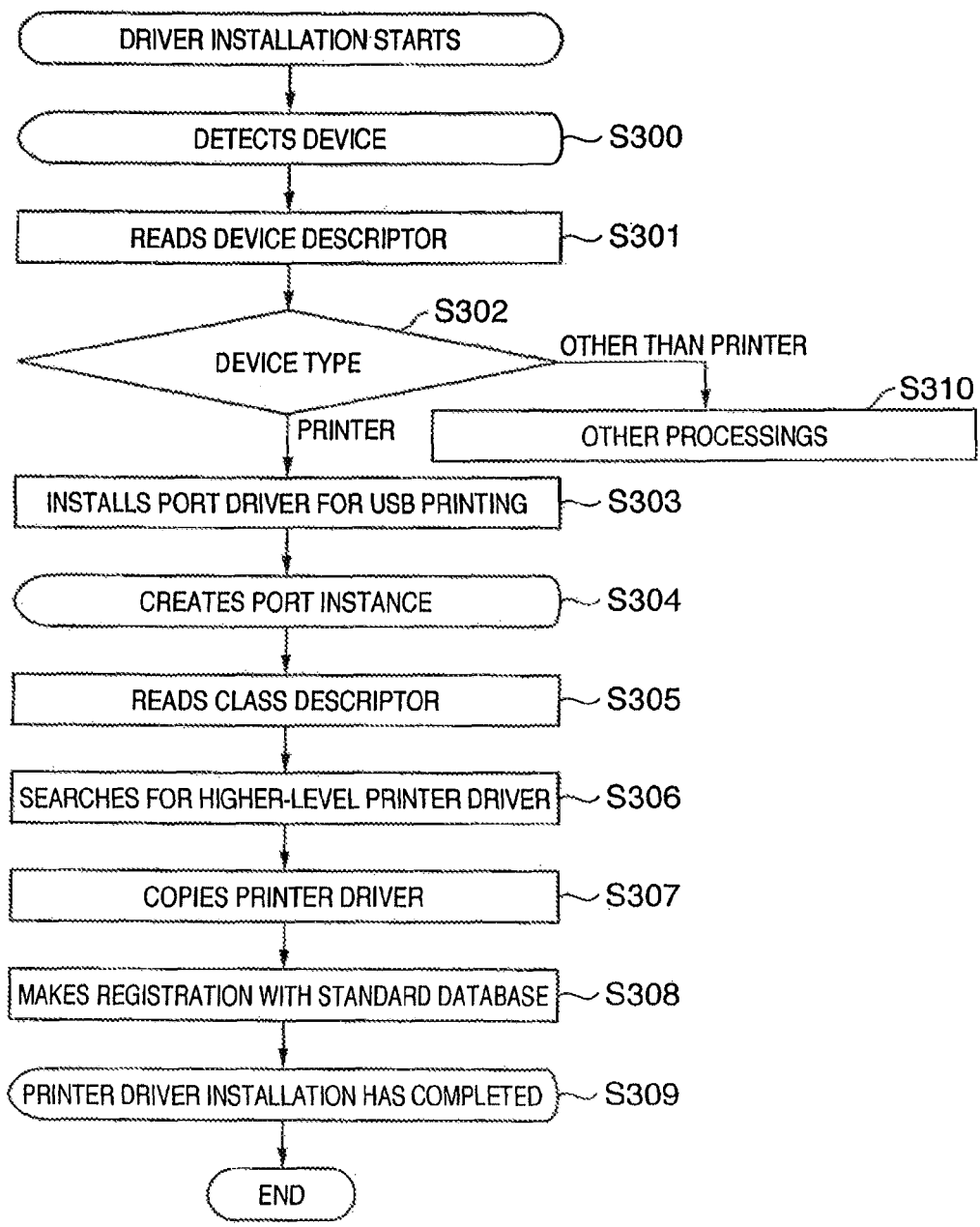
FIG. 3 is a flowchart of the common printer driver installation procedure.

As a typical plug-and-play wired interface, a USB interface is given. Here, description will be made on installation of a printer driver with the use of a USB interface as an example. FIG. 2 shows a screen to be displayed on the monitor of a PC at the time of installation, and FIG. 3 shows a flowchart of the installation. The sequence flow and the messages are applicable only when the plug-and-play has been normally performed. It goes without saying that there is an error sequence for the case where the plug-and-play has failed.

First, a user connects a printer to a PC with the use of a USB interface, which is a plug-and-play interface. The OS operating on the PC detects that the device has been connected to the PC via the USB interface (step S300 of FIG. 3). In this case, a screen like the screen 2-1 in FIG. 2 is displayed. When the user wants to perform installation, he presses an "install" button 2-2. On the other hand, when he doesn't want to install a printer driver, he presses a "cancel" button 2-3. When the button 2-2 is pressed, the OS reads a device descriptor, which is basic information about a USB device, from the printer in a predetermined method specified by USB (step S301). The device descriptor includes basic function information about the device, such as device class information indicating the kind of the device. The OS reads and analyzes the device descriptor and determines whether the connected device is a device which belongs to a printer class, that is, a printer (step S302). If the connected device is a printer, then the flow proceeds to step S303. If it is a device other than a printer, then the flow proceeds to step S310. At step 310, other processings appropriate for the device are performed.

In general, a device driver of a printer is configured mainly by two levels of sub-drivers. One is a port driver as lower-level sub-driver which controls, for interface with which the printer connects, a protocol for performing data communication with a corresponding device on the interface. The other is a printer driver as higher-level sub-driver which is located on a layer higher than the port driver and convert actual print application data to record data or a printer language appropriate for respective individual printers. The higher-level printer drivers also perform an operation of acquiring the operation state of the printer, that is, state information from the printer and handing over the state information to a printer state display application.

When the OS recognizes that the connected device is a printer, it installs an appropriate port driver and enables it, with the use of a predetermined method (step S303). The OS displays a screen like a screen 2-4 in FIG. 2 then. When the user wants to cancel installation of the port driver, he presses a "cancel" button 2-5. Furthermore, a port instance, which is a logical connection for performing one-to-one data communication between a particular device detected on an interface and a PC, under the control of the port driver. In the case of a USB printer, a port instance is created as a logical channel for performing communication between the printer and a PC after a port driver for USB printing is installed (step S304).

When the port driver is loaded and initialized, and then it gets ready to operate, the OS acquires a class descriptor as detailed information about the printer connected in a predetermined method (step S305). In the case of a USB printer, this is done by issuing a command to read a device ID (GET_CAPABILITIES) defined by the USB printer class standard, to the printer device via the port driver. A device ID returned by the printer as a response includes information specific to the printer model, such as the manufacturer information about and the model name of the printer and information about a supported printer language.

The OS obtains the detailed information about the connected USB printer and searches for an optimum higher-level printer driver based on the detailed information (S306). If an appropriate higher-level printer driver exists in the standard search range of the OS, then the higher-level printer driver found in the standard search range is incorporated. If an appropriate higher-level printer driver does not exist in the standard search range of the OS, then a message is displayed to the user which inquires about where the driver is stored. In this case, the user specifies a medium, such as a floppy (registered trademark) disk and a CD-ROM, enclosed with the device when the device is purchased or a device driver downloaded from a file server of the manufacturer via the Internet. Thereby, an appropriate higher-level driver is incorporated into the OS (step S307). When the higher-level driver is incorporated, the higher-level printer driver is copied to a predetermined location (directory) on the PC in accordance with a predetermined procedure.

Figure 4:
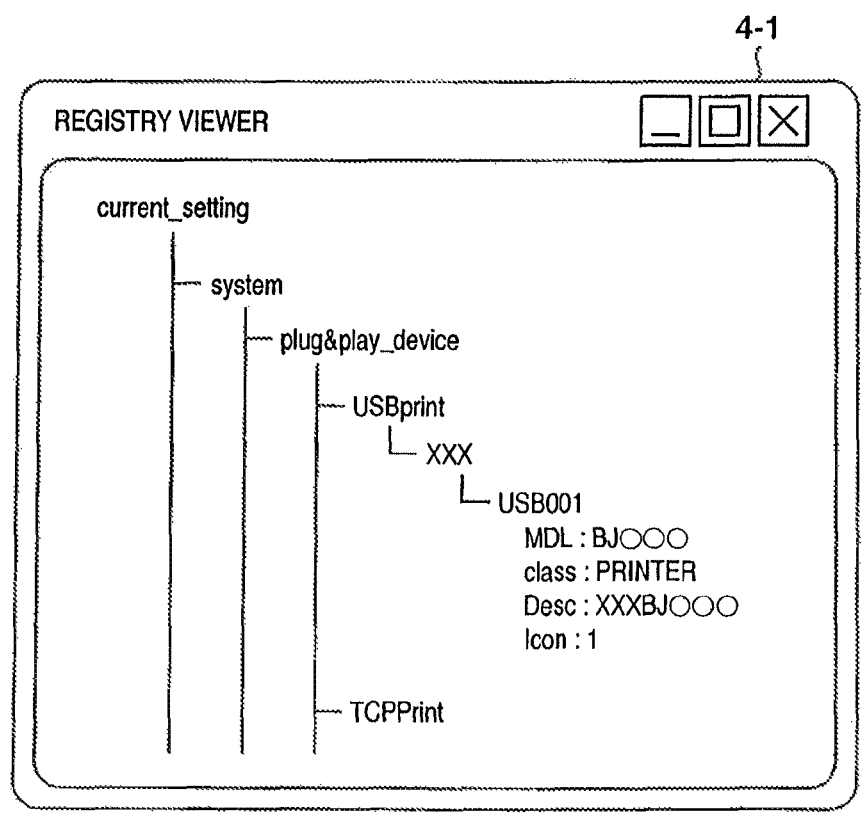
FIG. 4 shows an example of a settings database (registry) in an operating system.

Next, an item (entry) about the device for which installation is currently performed is added to a database provided for the OS as a standard (step S308). In this database, information is stored, such as setting parameters for control for each device, driver and device configuration, information about lower-level port drivers associated with device instances, port instance information, and information about settings by the user. In OS's such as Windows (registered trademark) 2000 and Windows (registered trademark) XP, this settings database is commonly referred to as a registry. In this embodiment also, it is hereinafter called a registry. An example of the registry is shown in FIG. 4.

This entry is created for each device which performs communication via a port instance created by the OS, that is, for each logical device. That is, an entry is prepared for each logical connection between the OS and a device, and corresponding port instance information is stored and thereby associated with the entry. For example, when a printer provided with multiple connection interfaces is connected to the PC via each interface, a port instance is created for each interface. Though the higher-level printer driver used by the same printer is common, an entry is created on the registry for each interface or for each logical connection.

As described above, when preparation for activation of the printer driver is completed, a message to the effect that installation has been completed is displayed as shown in a screen 2-6 in FIG. 2 (step S309).

Figure 5:
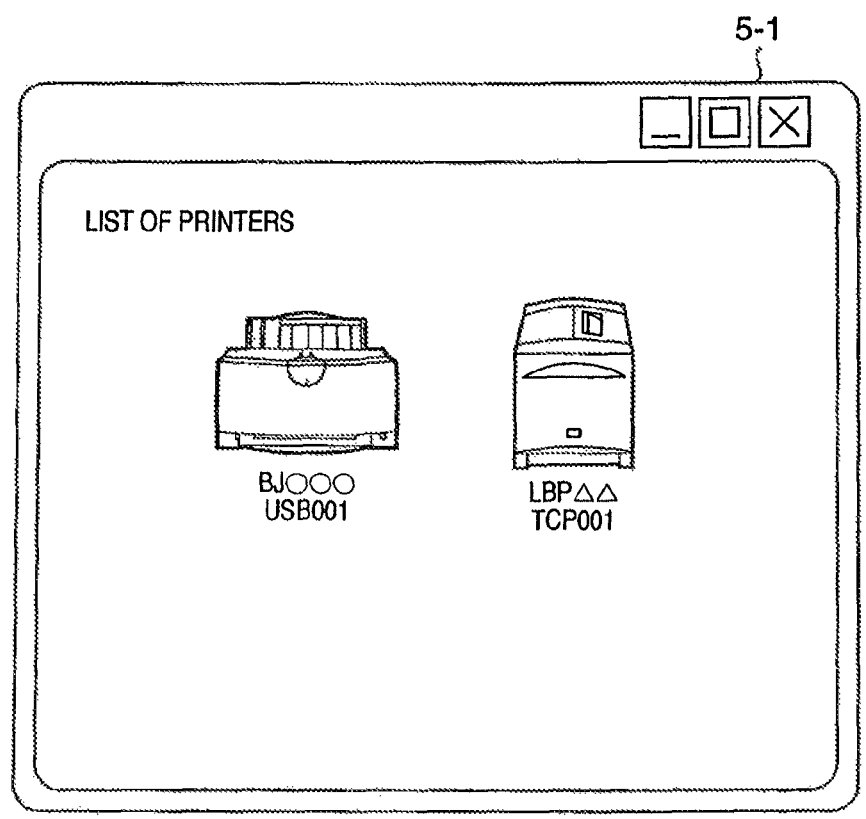
FIG. 5 shows an example of a screen for displaying a list of printers as printer icons.

On a printer list screen of an OS provided with GUI (graphical user interface), a port instance for a printer is visually displayed in a form of a printer icon. FIG. 5 shows an example. That is, if multiple port instances via multiple interfaces are created for a printer, a printer icon is displayed for each instance. Information about this association between a printer icon and a port instance is also described in the above-described entry created for each port instance. Therefore, information about which printer icon each port instance is visually indicated by is also managed.

Description has been made on the device driver installation processing for a plug-and-play OS with a USB printer as an example. Of course, a device driver may be installed in a different method depending on the kind of OS. However, installation of a plug-and-play device is performed in almost the same sequence as described above.

Printer Driver Installation of this Embodiment

Figure 6:
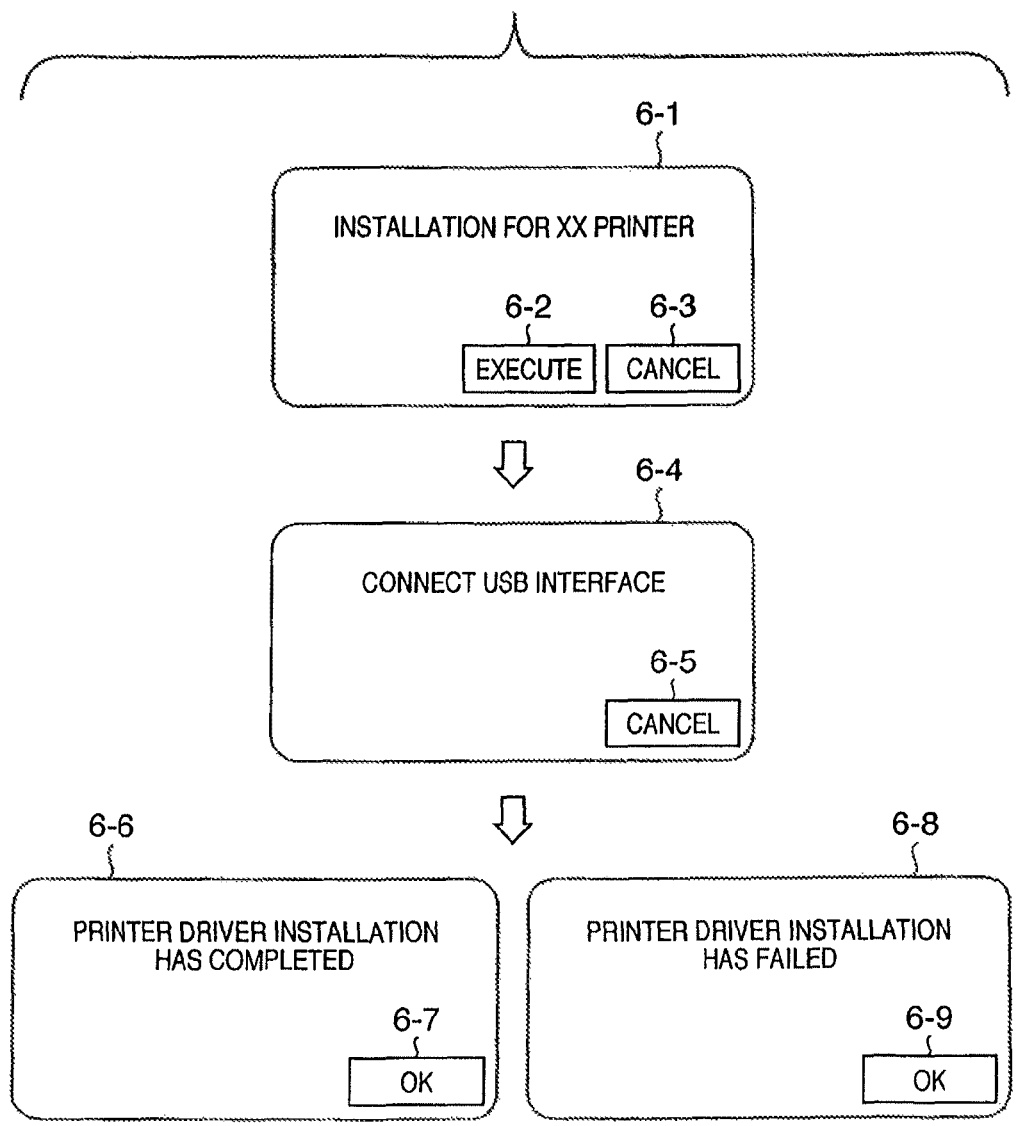
FIG. 6 shows an example of screens for printer driver installation processing according to this embodiment.

FIG. 6 shows an example of screens for the printer driver installation processing according to this embodiment. This example of screens is to be displayed on the screen of the PC 1-1 when a printer driver is installed in the PC 1-1 to perform printing with the printer 1-2 in FIG. 1.

A screen 6-1 is displayed as the first screen. This screen 6-1 is a screen for starting the printer driver installation processing, and it is displayed by a user activating software for installation. On the screen 6-1, there are selection icons 6-2 and 6-3 for selecting "execution" and "cancel", respectively. They can be selected by a pointing device such as a mouse. By selecting the "execution" 6-2, installation is started, and the next screen 6-4 is displayed. When the "cancel" 6-3 is selected, installation of a printer driver is not performed, and the flow ends.

On a screen 6-4, an instruction to connect a USB interface is displayed to the user. The user connects the USB interface 1-5 to the USB interface of the printer 1-2 in accordance with the instruction. When the printer 1-2 is not powered on, the user powers on the printer 1-2. On the screen 6-4, installation can be cancelled by the "cancel" 6-5

When the USB interface 1-5 is connected and the printer 1-2 is powered on, installation of a printer driver and internal setting of the printer 1-2 are completed by the plug-and-play. The installation of the printer driver by the plug-and-play is performed in the procedure described above.

When installation succeeds, a screen 6-6 is displayed, and the installation is completed. By selecting "OK" 6-7, the software ends. If installation of a printer driver fails for some reason, a screen 6-8 is displayed to inform the user that installation has failed. The software ends by selecting "OK" 6-9 similarly to the case of the screen 6-6.

As described above, by performing operations on the screens 6-1, 6-4 and 6-6 in that order, in accordance with instructions, installation of a printer driver with the use of a USB interface is completed, and it is enabled to send print data via the USB interface.

Figure 7:
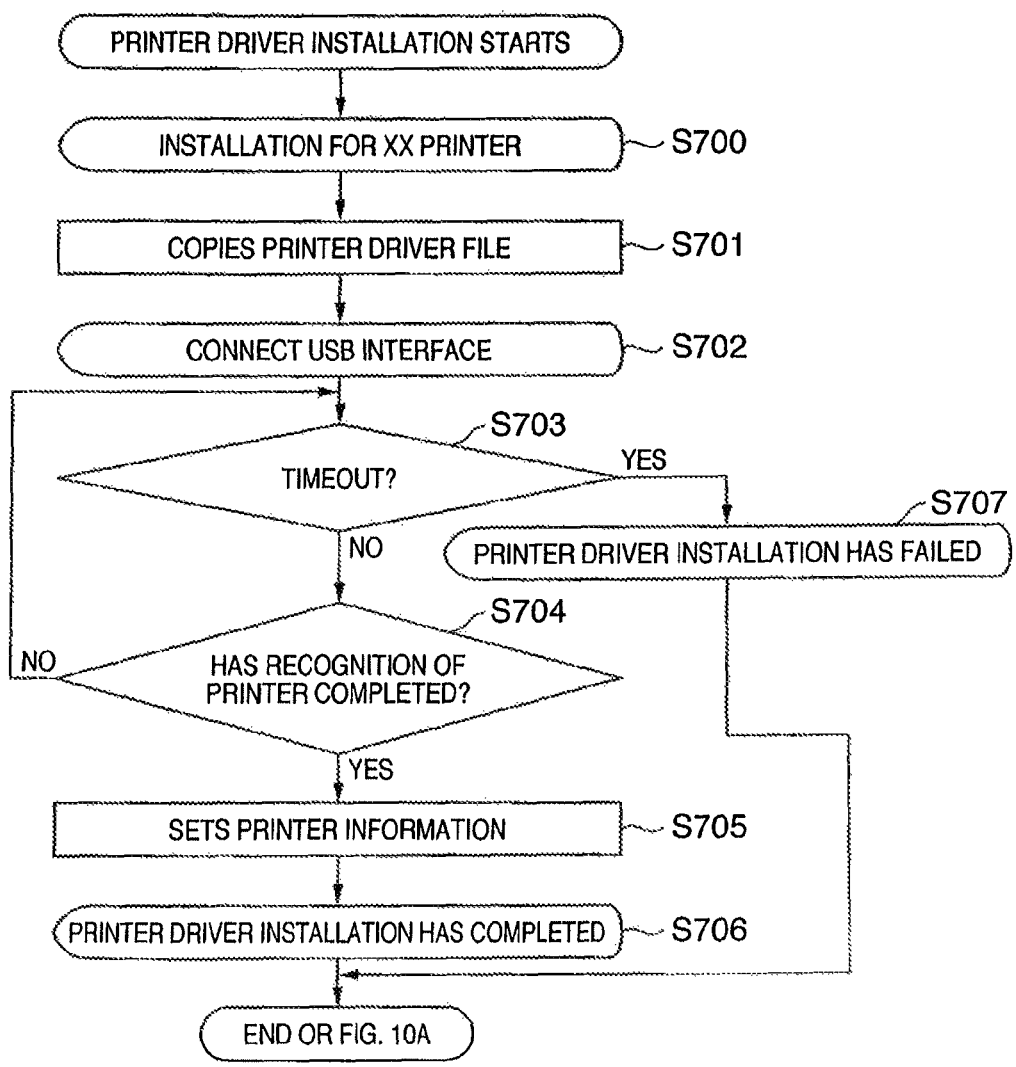
FIG. 7 is a flowchart of the printer driver installation according to this embodiment.

FIG. 7 is a flowchart of the processing to be executed by the OS of the PC 1-1, and it is a flowchart showing the printer driver installation processing of this embodiment in which the screens shown in FIG. 6 are to be displayed.

First, the screen 6-1 shown in FIG. 6 is displayed (step. S700). When the "execution" 6-2 is selected on the screen 6-1, the flow proceeds to step S701, and a printer driver execution file is copied to the system. That is, the place in the system where the printer driver execution file and an information file are to be arranged have been specified according to the OS, and the printer driver execution file is copied to the place. As described above, the OS finds an appropriate printer driver from a predetermined place for storing the printer driver information file, and performs registration and setting works so that the printer driver is usable. It is the processing that copies the printer driver related file to a specified place so that the works can be correctly performed.

Next, the screen 6-4 shown in FIG. 6 is displayed (step S702). It is determined whether a predetermined time period has elapsed after this screen was displayed (step S703). If the predetermined time period has not elapsed, that is, if a timeout has not occurred, then it is checked whether recognition of the printer has completed (step S704). This is to confirm whether the printer 1-2 has been correctly found by the plug-and-play. If the printer 1-2 has been found by the plug-and-play, it is assumed that recognition of the printer has completed.

If it is determined at step S703 that a timeout has occurred, then it is displayed on the screen 6-8 that installation has failed (step S707). If recognition of the printer 1-2 has completed at step S704, the flow proceeds to step S705, where printer information is set. Then, at step S706, the screen 6-6 showing that installation has normally ended is displayed. If the "OK" 6-7 is selected on the screen 6-6, the printer driver installation processing with the use of a USB interface is completed.

Since the printer 1-2 of this embodiment is provided with both of a USB interface and a wireless LAN interface, settings for wireless LAN (hereinafter referred to as installation for wireless network) to be described later are subsequently made after the installation of the printer driver ends.

Installation for Wireless Network of this Embodiment

In order to describe the advantages of this embodiment in a more understandable way, description will be made on the flow of conventional installation for wireless network first.

Figure 8:
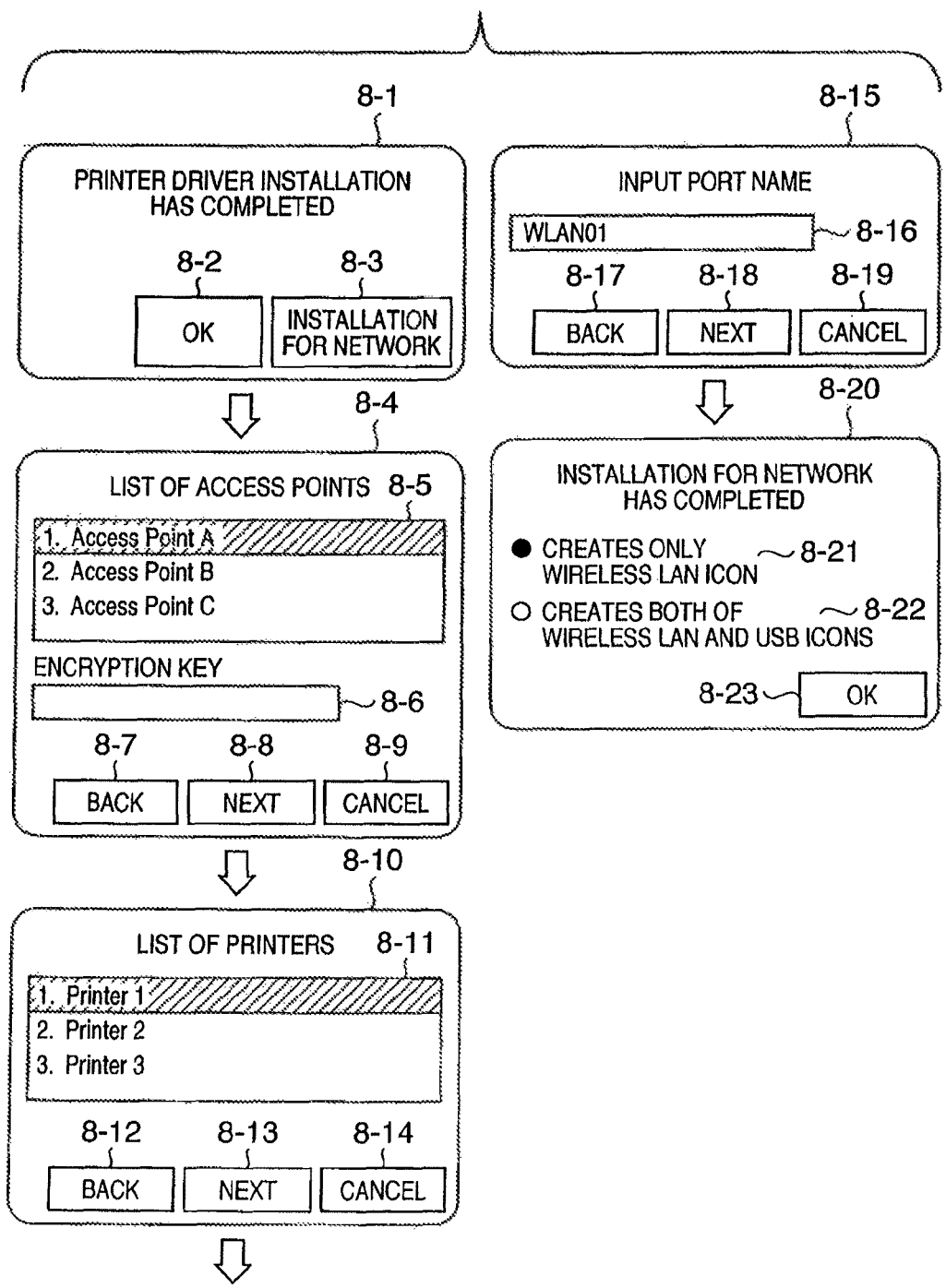
FIG. 8 shows conventional wireless network setting screens.

FIG. 8 shows screen displays in the case of performing installation for wireless LAN immediately after the printer driver installation described with reference to FIGS. 6 and 7 ends. In the case of performing installation only for a USB interface, the flow ends on the screen 6-6 in FIG. 6. However, in the case of performing also installation for a wireless LAN, a screen 8-1 in FIG. 8 is displayed.

When the screen 8-1 is displayed on the PC, and the user selects "OK" 8-2, the flow is completed here, and installation for wireless LAN is not performed. If "installation for network" 8-3 is selected on the screen 8-1, installation for network is subsequently started. Similarly, on a printer provided with a wired LAN interface in addition to USB and wireless LAN interfaces, a screen for selecting any of USB, wired LAN and wireless LAN interfaces as an interface to be usually used is displayed. When an interface other than the wireless LAN interface is selected, installation for wireless LAN is not performed.

When the "installation for network" 8-3 is selected, an operation of selecting an access point (AP) is performed to connect to the AP. With the use of a wireless LAN card attached to the printer, the PC sends an access point search command to the printer via the USB interface to display on the PC a list of AP's found from the printer. The AP information obtained as a result is acquired from the printer via the USB interface, and a list is displayed on a screen 8-4 based on the acquired content. A portion 8-5 is a portion in which a list of the AP's found from the printer is displayed. In this example, it shows that three access points A, B and C have been found from the printer. In this example, all AP's operating within a range where radio waves can reach are displayed, and they are not necessarily only those used by the user. If multiple AP's are displayed, the user must select a desired AP which he wants to connect to by moving among lines to be highlighted within the portion 8-5 within the screen.

If a selected AP is set so that encrypted communication should be performed, an encryption key for decrypting a code can be inputted in an input space 8-6. Thereby, the printer can be compatible with such an AP which performs encrypted communication. Generally, in a wireless LAN, an encryption technique is adopted to prevent interception or leakage of data. One of typical such techniques is WEP (Wired Equivalent Privacy), in which prevention of interception of the communication content by other devices is realized by the same encryption key being set on both of an encryption-side device and a decryption-side device. That is, when a wireless LAN is used in an encrypted environment, it is necessary to set the same encryption key for the printer. By selecting "back" 8-7 on the screen 8-4, it is possible to return to the previous screen 8-1. By selecting "next" 8-8, it is possible to specify the AP selected from the portion 8-5 and proceed to the next screen. By selecting "cancel" 8-9, it is possible to cancel the installation.

It is possible to select and specify an access point currently used, on the screen 8-4, and thereby erroneous connection to a different access point can be prevented. Then, when it is specified that connection to the printer is to be made via the AP specified on the screen 8-4, the specified AP is set for the printer via the USB interface, and the printer can be recognized via the AP.

The printer is searched for via the wireless LAN in order to confirm whether the printer is correctly connected. A screen 8-10 is a screen for displaying a list of printers found via the AP. The printer search is performed by printers receiving the printer search command which has been sent from the wireless LAN of the PC via the AP and returning a response. Receiving the responses, the PC displays the printers which have sent the responses as a list on the screen 8-10. The search command is sent to all devices on the network by broadcast. Each of devices which can receive and understand this command (in this case, particular printers and printer adapters) return information predetermined for the command, to the PC which has sent the command. This information includes the name, the identification information (ID) and the address of the printer, and the PC displays the information. By checking the display, the user can identify a printer to connect to, based on the information.

A list 8-11 of the found printers is displayed on the screen 8-10. In this example, three printers have been found and are displayed. Similarly to selection of an AP, a highlighted printer can be selected. It is possible to return to the previous screen 8-4 by selecting "back" 8-12 on the screen 8-10, and to determine the printer selected from the list 8-11 as the connection destination by selecting "next" 8-13. It is possible to cancel the installation by selecting "cancel" 8-14.

When the "next" 8-13 is selected on the screen 8-10, a screen 8-15 is displayed, which is a screen for inputting a port name. It is possible to input a port name in an input space 8-16. The port name is used to identify each printer, and WLAN01 is set as an initial value in this case. The "WLAN" is an identification name to indicate a wireless LAN printer, and the number "01" indicates the last number registered with the system. The number is consecutively given to distinguish multiple printers having the same functions. Generally, a printer driver specifies this port name to identify a printer to be used for printing. On the screen 8-15 also, it is possible to return to the previous screen 8-10 by selecting "back" 8-17 and to decide the port name inputted in the input space 8-16 by selecting "next" 8-18. By selecting "cancel" 8-19, it is possible to cancel the installation. When the "next" 8-18 is selected on the screen 8-15, a screen 8-20 is displayed, which is a screen indicating completion of the installation for network. There are two options on this screen. It is possible to select either an option 8-21 for creating only a wireless LAN printer icon or an option 8-22 for creating both of wireless LAN and USB icons.

The item with a black circle is an item which is currently selected, and it is possible to change the selected item by selection with a pointing device. By selecting "OK" 8-23 on the screen 8-20, a printer icon is created in accordance with the selection of either the option 8-21 or the option 8-22, and the setup program ends. Printer icons are used for the user to confirm or distinguish registered printers or identify printers which can be prepared currently. When performing printing from an application, a printer is selected with the use of such an icon.

Figure 9A:
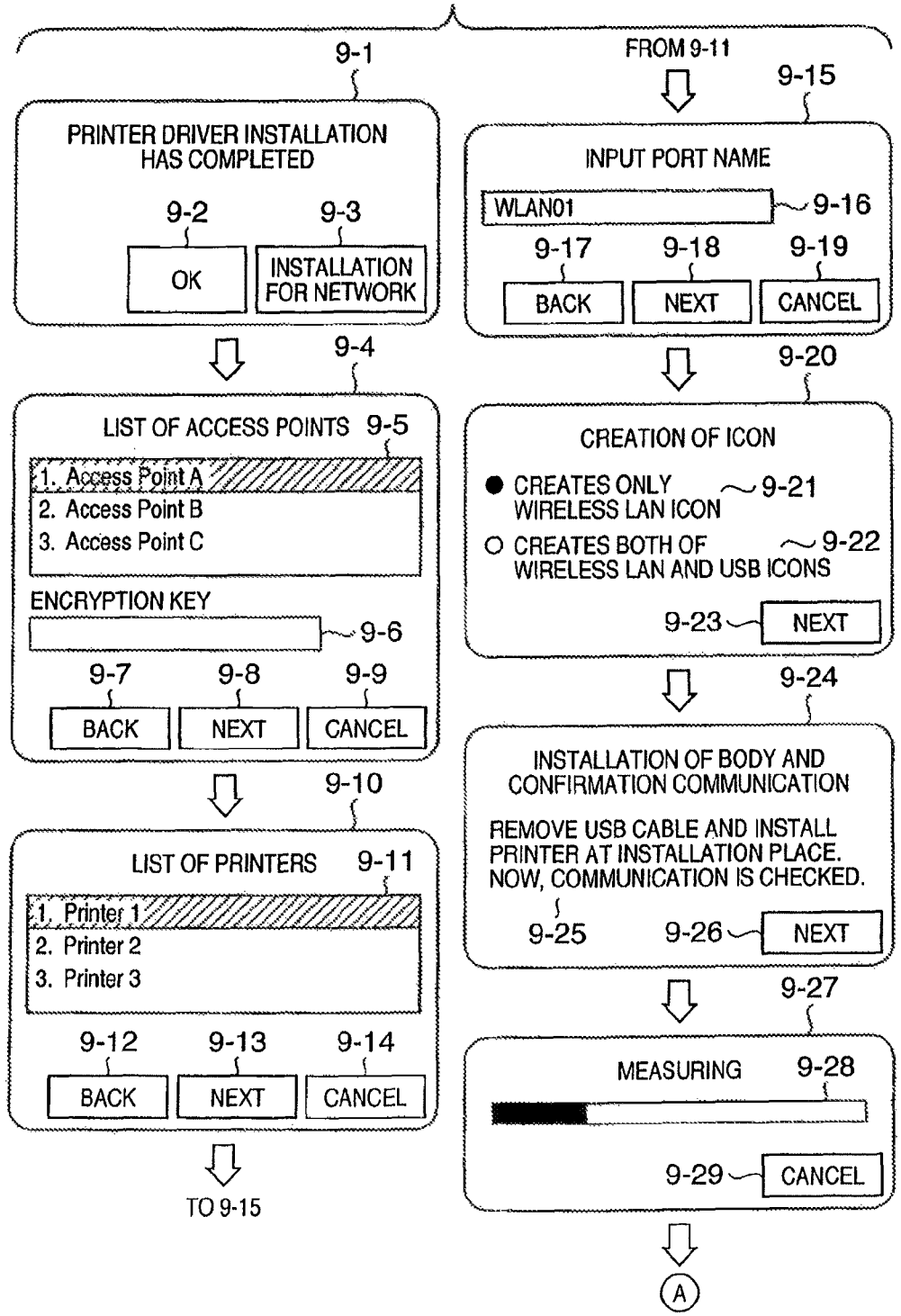

Next, description will be made on the procedure for installation for network in the case of using this embodiment, with the use of FIGS. 9A and 9B showing screens to be displayed with the flow.

FIGS. 9A and 9B show screen displays in the case of, after the printer driver installation described with reference to FIGS. 6 and 7 ends, subsequently making settings for wireless LAN. In the case of performing installation only for USB, the flow is completed on the screen 6-6 in FIG. 6. However, in the case of performing installation for wireless LAN, too, a screen 9-1 in FIG. 9A is displayed. In this embodiment, it is determined whether the connected printer supports only a USB interface or it is provided with both of USB and wireless LAN interfaces, based on the information acquired from the printer at step S705. Then, in the case of a printer which supports only a USB interface, the screen 6-6 in FIG. 6 is displayed. In the case of a printer provided with both of USB and wireless LAN interfaces, the screen 9-1 in FIG. 9A is displayed.

After the printer driver is installed, when the user selects "installation for network" 9-3 for the wireless LAN interface on the screen 9-1, installation for network is started without interruption.

The subsequent procedure from creation of a wireless LAN printer port to creation of an icon on a screen 9-20 is the same as the above-described procedure along the screens 8-1 to 8-20, and therefore, description thereof will be omitted.

The screen 9-10 can be omitted. In this case, an installer automatically selects a printer which corresponds to printer information obtained as a result of sending a command to acquire the name or ID of a USB-connected printer via the USB interface and printer information obtained from a response to a printer search command sent via a wireless LAN. Thereby, it is possible to omit the screen 9-10 for a step of selecting a printer.

It is also possible to omit a screen 9-15 by automatic creation of a printer port.

In this embodiment, after "next" 9-23 is selected on the screen 9-20 and a printer port and a printer icon are created, the flow proceeds to the next screen 9-24. On the screen 9-24, a message 9-25 is displayed to the user. This message 9-25 instructs that, since the communication quality between the PC and the printer is to be confirmed via a wireless LAN, the USB cable used for setup should be removed from the printer and the printer should be placed (permanent installation) at a place where it is actually used.

When the user places the printer 1-2 at a candidate position where it will be permanently used and selects "next" 9-26, a screen 9-27 is displayed. On the screen 9-27, confirmation of the communication quality at the place where the printer 1-2 is installed is started with the use of the wireless LAN interface. The confirmation of the communication quality begins with measurement of the electric intensity (such as a received electric field intensity and an S/N ratio) between the printer 1-2 and the AP 1-3. If, as a result of the measurement of the electric intensity between the printer 1-2 and the AP 1-3, in the printer 1-2, the electric intensity is equal to or above a predetermined level, then data transmission is performed between the PC 1-1 and the printer 1-2, and the communication quality of the entire network between the PC 1-1 and the printer 1-2 is measured.

The state of progress of the communication quality measurement is notified to the user by a progress bar 9-28. If the user wants to terminate the measurement for some reason, he can cancel it by selecting "cancel" 9-29. The details of the communication quality measurement will be described later in the description of flowcharts 10A and 10B indicating the procedure.

When the measurement is completed and the communication quality confirmation is completed, the flow proceeds to a determination result screen. A screen 9-30 or a screen 9-35 is displayed as the determination result screen depending on determination based on the communication quality confirmation. If the result of the measurement of the electric intensity between the printer 1-2 and the AP 1-3 is equal to or below a predetermined level, then it is determined that some trouble occurs in wireless LAN communication at the installation place, and the screen 9-30 is displayed. On the screen 9-30, a communication state 9-31 between the printer 1-2 and the AP 1-3 is displayed, and in this case, it is shown to the user that the communication state is not good. At the same time, an instruction is displayed to the effect that remeasurement should be performed after changing the location of printer placement again. The message to be displayed is changed according to the measurement result, and various messages are conceivable as shown in FIG. 13, in addition to that on the screen 9-30.

After reinstalling the printer, remeasurement of the communication quality can be performed by selecting "remeasurement" 9-33. Since the communication quality of the entire network between the PC 1-1 and the printer 1-2 has not been measured, the result 9-32 of the measurement is not displayed on this screen.

On the other hand, if the result of measuring the electric intensity between the printer 1-2 and the AP 1-3 is equal to or above a predetermined level, then it is determined that there is no problem in wireless LAN communication at the location where the printer was placed, and the screen 9-35 is displayed. On the screen 9-35, it is displayed that the electric intensity between the printer 1-2 and the AP 1-3 is good (9-36). In this case, the communication quality of the entire network between the PC 1-1 and the printer 1-2 is also determined. If the communication quality is determined to be equal to or below a predetermined quality level, then a message 9-37 to that effect is displayed. When the communication quality of the entire network is equal to or below a predetermined level even though the electric intensity between the printer 1-2 and the AP 1-3 is good, there is a high possibility that the communication quality between the PC 1-1 and the AP 1-3 is bad. Therefore, an instruction may be displayed that remeasurement should be performed after changing both of the installation place of the PC 1-1 and the installation place of the AP 1-3 or either of them. Various displays may be shown depending on the communication quality of the entire network as shown in FIG. 14.

Since communication measurement is performed again by selecting the "remeasurement" 9-33 or 9-38, the user can repeat measurement many times until a good measurement result is obtained. By selecting "complete" 9-34 or 9-39, setup is completed, and the setup program ends.

Figure 10A:
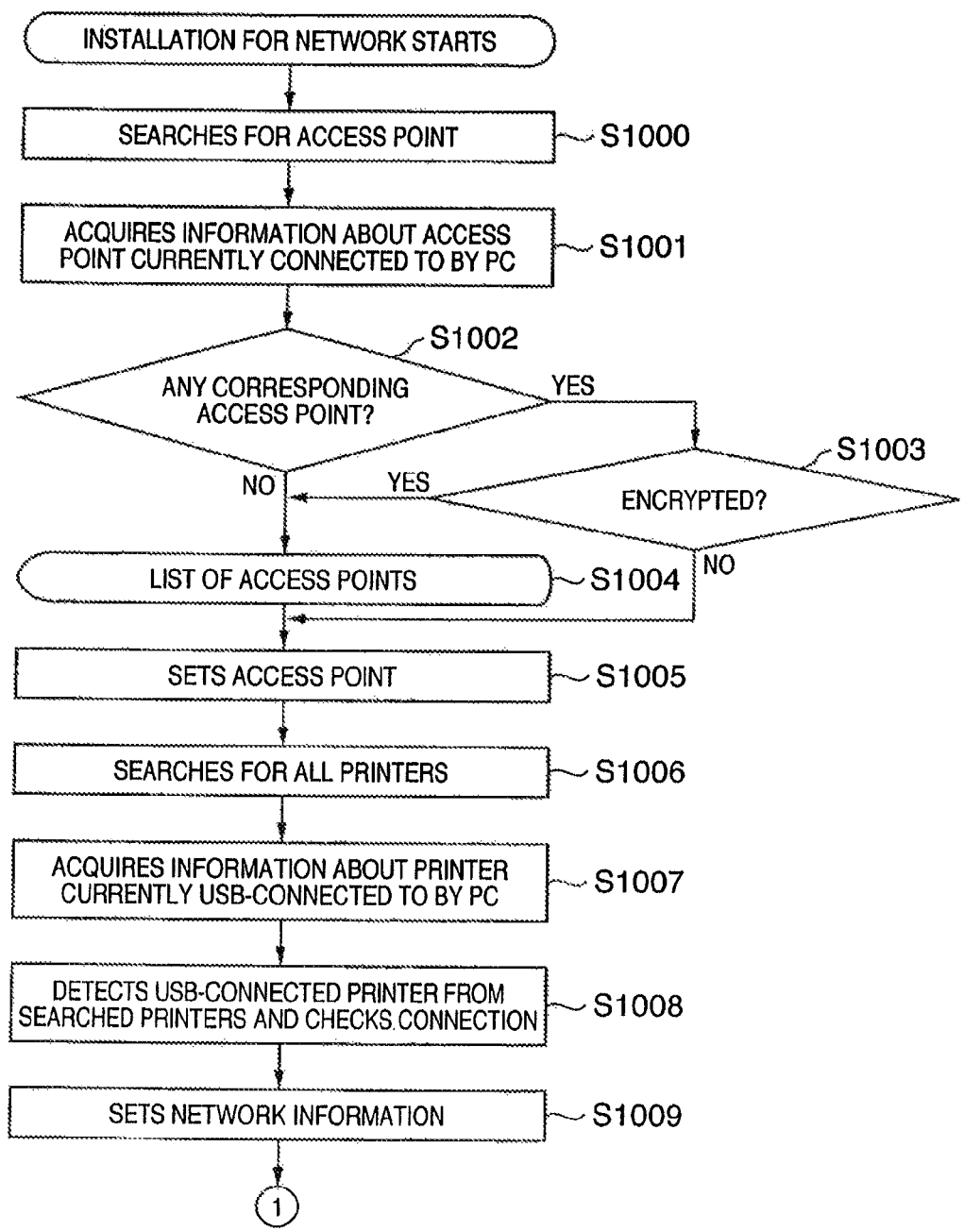

FIGS. 10A and 10B are flowcharts showing wireless network setting processing according to this embodiment in detail.

When the "installation for network" 9-3 in the screen 9-1 is selected, the PC 1-1 sends an access point search command to the printer 1-2 via the USB interface in order to display a list of AP's to be found from the printer 1-2 on the PC 1-1 (step S1000). Receiving the access point search command, the printer 1-2 searches for AP's and returns information about found AP's to the PC 1-1 via the USB interface. The PC 1-1 acquires the AP information from the printer 1-2 via the USB interface and displays it on a screen 9-4.

As commands for installation for wireless LAN to be sent from the PC 1-1 to the printer 1-2 via the USB interface, commands shown in FIG. 11 are provided. When the access point search command among them is sent to the printer 1-2, the printer 1-2 uses a wireless LAN module to make settings for access point search for the wireless LAN module. The wireless LAN module for which the access point search settings have been made transmits an access point search signal. An AP which receives this signal returns information (the SSID, radio wave condition, address, channel, encryption state and the like) about itself to the counterpart which has transmitted the search signal. As these signals, a probe request signal, a probe response signal, which is a response to the probe request signal, and the like can be used. The wireless LAN module of the printer 1-2 returns the information from the AP which has returned a response to the search signal, to the PC 1-1. In this case, the printer 1-2 returns information about all the found AP's, to the PC 1-1. Alternatively, when receiving the access point search command, the printer 1-2 monitors beacon signals from AP's. As a result of the monitoring, information included in a received beacon signal and a result of measuring the beacon signal may be returned to the PC 1-1.

At step S1001, information about the AP to which the PC 1-1 currently connects is acquired by communicating with the device driver of the wireless LAN card of the PC 1-1. Next, at step S1002, it is checked whether there is an AP corresponding to the AP to which the PC 1-1 currently connects, in the information about AP's returned from the printer 1-2. If a corresponding AP is found, the flow proceeds to step S1003. At step S1003, it is checked whether the target AP is operating in an encryption mode. If it is not operating in the encryption mode, the flow skips step S1004 and proceeds to step S1005, where settings for connection to the AP is made for the printer 1-2.

If there is not a corresponding AP at step S1002, or if, even though there is a corresponding AP, input of an encryption key is required, then the flow proceeds to step S1004. At step S1004, the screen 9-4 for a list of AP's is displayed, and the user is caused to input an encryption key or select an AP. On the screen 9-4, if input of an encryption key is required though a corresponding AP has been found at step S1002, the corresponding AP may be kept in a selected condition.

The settings for AP connection at step S1005 is performed by sending an information setting command, one of the network controller control commands shown in FIG. 11, to the printer 1-2 via the USB interface, based on information of the AP's found at step S1000. By the information setting command, information required to use an AP, such as the address of the AP, an encryption key and the like, is set for the printer 1-2. Thereby, it is possible to connect the printer 1-2 to a particular AP. Next, at step S1006, the various network commands shown in FIG. 12 are used to search for a printer. A printer search command (broadcast) is a printer search command (broadcast) to be broadcast without specifying a destination counterpart. A printer search command (with address specified) is a printer search command (with address specified) to be sent, specifying a particular destination counterpart.

Here, the PC 1-1 sends a broadcast search command via the AP. The command is transmitted onto a wireless LAN, and a printer which receives this command from the wireless LAN returns information about the printer (such as the ID, name, address and model name) to the PC 1-1 which has sent the command. Since this command is sent by broadcast, there is a possibility that all printers which can understand this command return a reply in response to this command. The PC 1-1 has to choose the model for which the PC 1-1 is about to perform installation, from the information sent by the printers.

In order to identify the USB-connected printer 1-2 from among found printers, the PC 1-1 acquires printer information about the printer 1-2 via the USB interface (step S1007). This is done by sending the information acquisition command shown in FIG. 11 to the printer 1-2 via the USB interface and acquiring the printer information as a response to the command. By comparing acquired printer information, a printer corresponding to the USB-connected printer 1-2 is identified from among the printers found via the wireless LAN (step S1008). At step 1009, network information is set, and the wireless LAN becomes usable. The network information indicates information required for printing, such as the address and the name of the printer 1-2.

After that, processing for performing measurement of the wireless LAN communication quality of the printer 1-2 and determination of the communication quality is started. At step S1010, when the network information is set for the printer 1-2 as a result of the wireless LAN interface being selected as an interface to be usually used at step S1010, the screen 9-24 is displayed. On the screen 9-24, a message screen is displayed which instructs the user to remove the USB cable and install the printer 1-2 where it is used (step S1011). If the interface through which setup is being performed is not the wireless LAN interface, or it is apparent that communication via a wireless LAN is not currently possible for a setup procedure reason, then the following processing is omitted, and the setup program ends.

In accordance with the instruction of the message, the user removes the USB connection between the PC 1-1 and the printer 1-2, and installs the printer 1-2 where it is used with the use of a wireless LAN. After the installation, by selecting the "next" 9-26 on the screen, the flow proceeds to the next processing. It is also possible to check the USB connection between the PC 1-1 and the printer 1-2 in order to confirm that the user has moved the printer 1-2, and proceed to the next processing after detecting that the USB connection has been removed.

At step S1012, measurement of communication is started. The measurement is classified into two kinds. One is measurement of the electric intensity between the printer 1-2 and the AP 1-3. The other is measurement of the electric intensity between the PC 1-1 and the printer 1-2. First, measurement of the communication quality between the printer 1-2 and the AP 1-3 by acquiring the electric intensity between both devices is started. The electric intensity is a value which the printer 1-2 derives from periodical communication with the AP 1-3. The PC 1-1 can acquire this value by issuing an electric intensity acquisition command, one of the network controller control commands for the printer 1-2, to the printer 1-2 and receiving a response from the printer 1-2. In the acquisition and measurement of the electric intensity, the PC 1-1 issues the electric intensity acquisition command to the printer 1-2 a predetermined number of times for a predetermined period. The printer 1-2 measures the electric intensity (such as a received electric field intensity and an S/N ratio) at the time of receiving this command and sends the result of the measurement to the PC 1-1 as a response. The PC 1-1 calculates a measurement average value WX by acquiring electric intensity information included in the response from the printer 1-2 and then calculating an average value. If the measurement average value WX obtained by this measurement does not satisfy a predetermined minimum reference measurement value WY, it is determined that the wireless communication state between the printer 1-2 and the AP 1-3 will significantly affect the normal operation (step S1013). In this case, it is determined that further measurement is unnecessary, and measurement is not performed anymore. Then, the screen 9-30 is displayed at step S1018 to notify the user of the determination based on the measurement result and instructs him to rearrange the printer (9-31). Since measurement between the PC 1-1 and the printer 1-2 has not been performed, the result of the measurement (9-32) is not displayed on the screen 9-30.

By selecting the "remeasurement" 9-33, the user can perform measurement again after reinstalling the printer (step S1019).

On the other hand, if the measurement average value WX is larger than the minimum reference measurement value WY, then the flow proceeds to the next measurement (step S1014). At step S1014, in order to measure the communication performance between the PC 1-1 and the printer 1-2, predetermined data is sent from the PC 1-1 with the use of a payload transfer measurement command, and a response to the command is received from the printer 1-2. It is repeated for a predetermined time period to confirm receiving of the response and then send the data again, and the communication state NX, which is the number of times of receiving a response success packet, is measured. Thereby, it is possible to determine whether the average time required for one data transfer is desirable or not. When normally receiving the payload transfer measurement command, the printer 1-2 immediately sends a normal receiving response to the transmission source without performing any processing for the payload data. Thereby, the time from sending the command to receiving a response does not include data processing time other than the time for sending and receiving by the printer 1-2 through the network. Therefore, the time can be an index for measurement of pure data transmission time on the network. The command can be sent with a data payload added thereto, and it is sent with a data payload of the same amount as is sent when printing is actually performed. Thereby, it is possible to perform measurement and determination appropriate for actual use. The measurement is performed for a predetermined time period as described above. However, if the communication environment is good, and if, when sending is performed a predetermined number of times within the time period, a response success packet is received the same number of times, then it is possible to determine that the communication state is the best and immediately terminate the measurement processing. After the measurement ends, the measurement result NX is determined at step S1015. If the measurement value NX is equal to or below a predetermined determination reference value NY, then it is determined that the network communication quality between the printer 1-2 and the PC 1-1 is significantly bad, and that there is a possibility that the operation of the printer is affected (step S1015).

The recording resolution or the performance of printers is different according to types, and the amount of print data may be different. It is also conceivable to make measurement conditions changeable and perform measurement after changing the measurement conditions according to the type, in order to perform accurate measurement for each type. An embodiment is also conceivable in which the type of a printer to be measured is detected in a predetermined method; a payload for measurement corresponding to predetermined print data is sent according to the type; and a determination reference NY according to the type is used for determination.

In the case of performing communication measurement, giving importance to communication quality in a wireless LAN environment, an embodiment is also conceivable in which possibility of measurement is determined according to the network connection form of a PC. In this case, there is provided means for determining whether the PC is equipped with a wireless LAN interface and communicates with a printer in a condition that it is connected to a predetermined AP. As a result of the determination, only when the PC is connected to the printer via the wireless LAN interface, measurement between the PC and the printer is performed.

After the above-described two kinds of communication quality measurement are performed, the measurement processing and the determination processing are completed, and the screen 9-35 is displayed which notifies the measurement result and the determination to the user in accordance with the determination. On this screen, the communication quality measurement result 9-36 between the printer 1-2 and the AP 1-3 is displayed. At the same time, the result 9-37 of the electric intensity measurement between the PC 1-1 and the printer 1-2 is also displayed.

If it is determined that the network communication quality between the printer 1-2 and the PC 1-1 is significantly bad as a result of the determination of the measurement value NX at step S1015, then, for example, a notification is displayed together with the determination result to the effect that the network settings and/or the device configuration should be reconsidered to improve the communication quality (step S1017). On the other hand, if it is determined that there is no problem in the network state as a result of the determination, only the measurement result is displayed, and a message is displayed to the effect that the communication quality is within an allowable range (step S1016).

It is also possible for the user to reinstall the printer and perform measurement again to realize a more desirable communication quality. In this case, by selecting the "remeasurement" 9-38 after reinstalling the printer, remeasurement can be started (step S1019).

If a desirable communication quality measurement result can be obtained at the current installation location, the setup program is completed by selecting the "complete" 9-39 (S1020).

FIG. 11 shows network controller control commands to be sent to a printer for installation for network. In addition to these, there are a command for sending print data, a command for making various printer settings and the like. Only examples of installation commands used in this embodiment are shown. Among these commands, an electric intensity acquisition command is used for a PC to acquire the electric intensity between an AP and a printer in the communication quality measurement processing of this embodiment. These commands are issued via a USB interface or via a network depending on the situation.

FIG. 12 shows commands used in this embodiment, among commands to be issued to a network. They are sent to a printer via a wireless LAN. In addition to these, there are a command for sending print data, command for making various printer settings and the like, but description thereof is omitted here.

A payload transfer measurement command is a characteristic command in this embodiment, and it is a command for measurement which is issued from a PC to a printer to measure the communication state between the PC and the printer. Printer search commands includes a command to be received by all printers and a command to be received only by particular printers, and they are used to search for printers on a network. These commands are transferred and responded to via a common protocol such as TCP/IP and UDP on a network.

FIG. 13 shows criteria for determination of the measurement result WX of the electric intensity between a printer and an AP, and examples of a notification message to the user to be displayed on the screen 9-30 or the screen 9-35 according to the value of WX.

FIG. 14 shows criteria for determination of the measurement result NX of the electric intensity between a printer and a computer, and examples of notification message to the user to be displayed on the screen 9-35 according to the value of NX.

As described above, in a device for preparing for, via a wired interface, communication between a device and a client computer which communicate with each other via wireless interfaces, and a setup program therefor, it is instructed to a user, after wireless interface communication settings for both of the computer and the device are made via the wired interface by a setup unit for the wireless interface device, that the device should be installed at a place and in a connection configuration used when the user actually use the device. After this instruction, the state of the communication quality between the device and an access point or between the computer and the device is measured; the result is presented; and it is prompted to change the installation location as necessary.

According to the above-described embodiment, by causing a user to install a device in consideration of the communication performance when he makes communication settings for the device, it is possible to prevent rearrangement of the device from being performed because of a communication trouble, and thereby convenience can be improved.

When the radio wave condition of a wireless interface is good, measurement of the communication quality between a computer and a printer is also performed by actually sending the data amount on the assumption of printing. Thus, it is advantageous that an accurate communication performance can be grasped.

According to the present invention, by causing a user to install a device in consideration of the communication quality when he sets up the device, it is possible to prevent rearrangement of the device from being performed because of a communication trouble, and thereby convenience can be improved.

As many apparently widely different embodiments of the present invention can be made without departing from the spirit and scope thereof, it is to be understood that the invention is not limited to the specific embodiments thereof except as defined in the claims.

This application claims the benefit of Japanese Patent Application No. 2005-157101, filed May 30, 2005, which is hereby incorporated by reference herein in its entirety.

What is claimed is:

1. A system provided with a peripheral device capable of wirelessly communicating via a relay device, and a host device, the peripheral device comprising:
   a wireless interface capable of wirelessly communicating via the relay device; and
   the host device comprising:
   at least one processor;
   a memory comprising instructions executed by the processor to implement:
   a first confirmation unit configured to confirm a first quality of communication between the peripheral device and the relay device by using the wireless interface;
   a second confirmation unit configured to confirm a second quality of network communication between the host device and the peripheral device via the relay device by using the wireless interface; and
   a display unit configured to control (i) displaying first information concerning the first quality of communication and, according to the second quality of communication, second information concerning the second quality of communication in a case that the first quality of communication is above a predetermined value, and (ii) displaying the first information and an indication that a communication condition between the peripheral device and the relay device should be improved without displaying the second information in a case that the first quality of communication is below the predetermined value.

2. An information processing device, which communicates a peripheral device comprises a wireless interface capable of wirelessly communicating via a relay device, comprising:
   at least one processor;
   a memory comprising instructions executed by the processor to implement:
   a first confirmation unit configured to confirm a first quality of communication between the peripheral device and the relay device by using the wireless interface;
   a second confirmation unit configured to confirm a second quality of communication between the information processing device and the peripheral device via the relay device by using the wireless interface; and
   a display unit configured to control (i) displaying first information concerning the first quality of communication and, according to the second quality of communication, second information concerning the second quality of communication in a case that the first quality of communication is above a predetermined value, and (ii) displaying the first information and an indication that a communication condition between the peripheral device and the relay device should be improved without displaying the second information in a case that the first quality of communication is below the predetermined value.

3. A peripheral device comprising:
   a wireless interface capable of wirelessly communicating with a host device via a relay device;
   at least one processor;
   a memory comprising instructions executed by the processor to implement:
   a first measurement unit configured to measure a first quality of communication between the peripheral device and the relay device by using the wireless interface;
   a second measurement unit configured to measure a second quality of communication between the host device and the peripheral device via the relay device by using the wireless interface; and
   a notification unit configured to notify the host device of (i) first information concerning the first quality of communication and second information concerning the second quality of communication in a case that the first quality of communication is above a predetermined value, and (ii) the second information and an indication that a communication condition between the peripheral device and the relay device should be improved in a case that the first quality of communication is below the predetermined value.

4. A display method for a host device which communicates with a peripheral device provided with a wireless interface capable of wirelessly communicating via a relay device; the display method comprising:
   a first confirmation step of confirming a first quality of communication between the peripheral device and the relay device by using the wireless interface;
   a second confirmation step of confirming a second quality of network communication between the host device and the peripheral device via the relay device by using the wireless interface; and
   a display step of (i) displaying first information concerning the first quality of communication and, according to the second quality of communication, second information concerning the second quality of communication in a case that the first quality of communication is above a predetermined value, and (ii) displaying the first information and an indication that a communication condition between the peripheral device and the relay device should be improved without displaying the second information in a case that the first quality of communication is below the predetermined value.

5. The display method according to claim 4, wherein the second confirmation step confirms the second quality of network communication in accordance with the first communication quality.

6. The display method according to claim 4, wherein
the display step displays, if the first quality of communication is below a predetermined value, a message which indicates that the installation place of the peripheral device should be changed without displaying the second information concerning the second quality of communication.

7. The display method according to claim 4, wherein
the display step displays the first information concerning the first quality of communication and the second information concerning the second quality of communication in different representations each other.

8. The display method according to claim 4 further comprising:
a determination step of determining a state of the network communication between the host device and the peripheral device based on the second quality of communication; and
wherein the display step displays a message which indicates that the network settings and/or the device configuration should be changed in accordance with the determination determined by the determination step.

9. The display method according to claim 4, wherein the display step display the first quality of communication between the peripheral device and the relay device and the second quality of communication between the peripheral device and the host device distinguishably.

10. The display method according to claim 4, wherein
the confirmation of the second quality of communication between the host device and the peripheral device is performed by sending a pre-specified amount of data from the host device to the peripheral device.

11. The display method according to claim 10, further comprising
an identification step of identifying the type of the peripheral device; wherein the pre-specified amount of data is determined based on the type of the peripheral device identified by the identification step.

12. The display method according to claim 4, wherein
the second confirmation step sends data for measurement, the amount of which is based on the data amount to be transferred from the host device when the host device uses the peripheral device, from the host device to the peripheral device multiple times and regards the average of response times of responses thereto as a measurement result.

13. The display method according to claim 4, wherein the second confirmation step confirms the second quality of communication between the host device and the peripheral device when the first quality of communication between the peripheral device and the relay device is above the predetermined value.

14. The display method according to claim 4, wherein
the display step displays the first information as a bar graph and displays the second information as a message.

15. The display method according to claim 4, wherein the second confirmation step does not perform in a case that the first quality is below the predetermined value.

16. The display method according to claim 4, wherein
the display step displays the first information as a bar graph, an icon according to the first quality and a message according to the first quality.

17. The display method according to claim 4, wherein the display step displays a message which indicates that an installation place of the peripheral device should be changed.

18. The display method according to claim 4, wherein the indication is an indication that the peripheral device should be relocated.

19. A method of controlling an information processing device, which communicates a peripheral device comprises a wireless interface capable of wirelessly communicating with the information processing device via a relay device, the method comprising:
confirming a first quality of communication between the peripheral device and the relay device by using the wireless interface;
confirming a second quality of communication between the information processing device and the peripheral device via the relay device by using the wireless interface; and
displaying (i) first information concerning the first quality of communication and, according to the second quality of communication, second information concerning the second quality of communication in a case that the first quality of communication is above a predetermined value, and (ii) displaying the first information and an indication that a communication condition between the peripheral device and the relay device should be improved without displaying the second information in a case that the first quality of communication is below the predetermined value.

20. A method of controlling a peripheral device comprising a wireless interface capable of wirelessly communicating with a host device via a relay device, the method comprising:
measuring a first quality of communication between the peripheral device and the relay device by using the wireless interface;
measuring a second quality of network communication between the host device and the peripheral device via the relay device by using the wireless interface; and
notifying the host device of (i) first information concerning the first quality of communication and second information concerning the second quality of communication in a case that the first quality of communication is above a predetermined value, and (ii) the second information and an indication that a communication condition between the peripheral device and the relay device should be improved in a case that the first quality of communication is below the predetermined value.

21. A non-transitory computer-readable storage medium storing a computer program, the computer program causing a computer to execute the method according to claim 19.

22. A non-transitory computer-readable storage medium storing a computer program, the computer program causing a computer to execute the method according to claim 20.

* * * * *